H. C. & J. C. ADAM.
TROLLEY WHEEL.
APPLICATION FILED JULY 13, 1914.

1,141,512.

Patented June 1, 1915.

WITNESSES

INVENTORS.
H.C. Adam
J.C. Adam
by Fetherstonhaugh & Co.
attys.

UNITED STATES PATENT OFFICE.

HENRY CARL ADAM, OF HAMILTON, AND JACOB CHRISTOPHER ADAM, OF TRENTON ONTARIO, CANADA.

TROLLEY-WHEEL.

1,141,512.  Specification of Letters Patent.  Patented June 1, 1915.

Application filed July 13, 1914. Serial No. 850,666.

*To all whom it may concern:*

Be it known that we, HENRY CARL ADAM, a subject of the King of Great Britain, and a resident of the city of Hamilton, in the county of Wentworth, in the Province of Ontario, Canada, and JACOB CHRISTOPHER ADAM, a citizen of the United States, and a resident of the town of Trenton, in the county of Hastings, in the Province of Ontario, Canada, have invented certain new and useful Improvements in Trolley-Wheels, of which the following is the specification.

Our invention relates to improvements in trolley wheels, and the object of the invention is to devise a simple and effective trolley wheel of the ball bearing type in which the ball bearings can be inserted into the wheel and removed therefrom with a minimum of trouble.

A further object is to construct a trolley wheel in which the ball bearings are interchangeable.

A still further object is to construct a trolley wheel having the minimum of friction and which can be effectively lubricated without splashing the lubricating oil over the top of the car.

Another object is to devise a trolley wheel in which any of the parts can be removed with greater facility than in the trolley wheels at present in use.

Our invention consists of the parts constructed and arranged as hereinafter more particularly described and illustrated in the accompanying drawings in which:—

Figure 1:
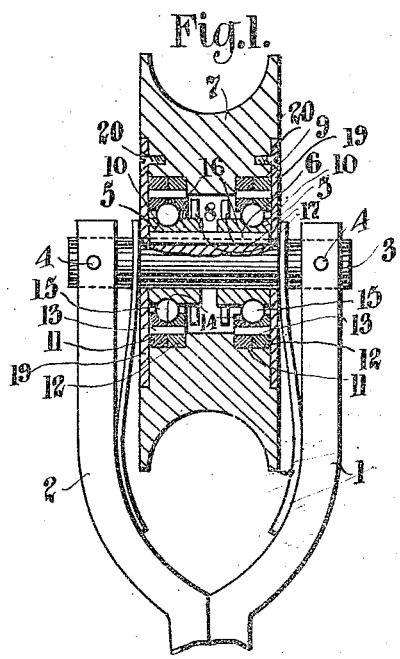
Figure 2:
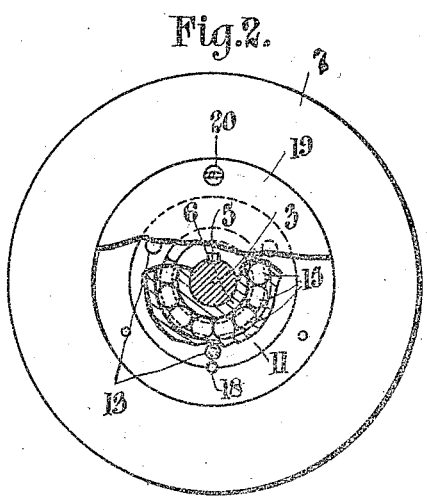

Figure 1 represents a cross sectional view of a trolley wheel constructed according to our invention. Fig. 2 is a side view thereof partly in section.

Like characters of reference indicate corresponding parts in the different views.

1 and 2 are the portions of a divided trolley pole harp.

3 is the axle extending through the harp portions and secured thereto by the pins 4.

5, 5 are independent collars secured to the axle 3 by the key 6.

7 is a trolley wheel portion having the hollow interior or center 8 provided with circumferential grooves 9 extending to the sides of the trolley wheel.

10, 10 are ball races on the collars 5.

11, 11 and 12, 12 are the portions of the divided annular ball race portions respectively secured together by the rivets 13, and having the ball races 14 on the inner surface thereof, said ball races registering with the ball races on the collars.

15, 15 are balls inserted between the ball races.

16, 16 are the inwardly extending shanks on the collars 5, said inwardly extending shanks carrying the pins 17.

18 is a key inserted between the ball race portions 13 and 14 and the wall of the groove 9 for securing the ball race portions to the trolley wheel portion and compelling the same to turn therewith.

19, 19 are plates counter-sunk into the sides of the trolley wheel portion and suitably secured thereto by the screws 20.

Vaseline or other suitable lubricant is adapted to be inserted into the hollow center 8 of the trolley wheel portion. Thus when the trolley wheel portion 7 and the ball races 11, 12, are connected the vaseline will properly lubricate the balls and will prevent any friction in the ball races. Further the vaseline or other suitable lubricant revolving to a certain extent with the trolley wheel portion will be stirred or agitated by the pins 17. Thus an effectively lubricated wheel will be produced and one which will be capable of giving the maximum of service. Further when it is desired to remove the ball bearings it is only necessary to remove the plates 19 and the key 6 when the ball bearings can be removed as a whole. The ball bearings are interchangeable and can be inserted with equal facility into either side of the trolley wheel portion; also as the lubricant is heavy and as the wearing parts are totally incased there is no danger of the lubricant being thrown about as so frequently occurs in the self-oiling wheels at present in use.

What we claim as our invention and desire to secure by Letters Patent is:—

1. In combination in a trolley wheel, an axle with bearing elements keyed thereto, lubricant agitating means carried by said elements, of a rotatable member having recesses, bearing elements located in some of said recesses, plates located in other of said recesses and antifriction members located between the first mentioned and last mentioned bearing elements.

2. In combination in a trolley wheel, an axle with bearing elements keyed thereto, radial pins carried by said bearing elements, a rotatable member having recesses, bearing elements located in some of said recesses, plates located in other of said recesses and antifriction members located between the first mentioned and last mentioned bearing elements.

In testimony whereof, we have signed at the city of Hamilton, in the county of Wentworth, in the Province of Ontario, Canada, this 3rd day of June, 1914.

HENRY CARL ADAM.
JACOB CHRISTOPHER ADAM.

Witnesses:
J. E. M. FETHERSTONHAUGH,
F. J. GAVIN.